(12) United States Patent
Prystupa et al.

(10) Patent No.: US 11,691,183 B2
(45) Date of Patent: Jul. 4, 2023

(54) METHOD AND APPARATUS FOR SINGULATING PARTICLES IN A STREAM

(71) Applicant: 9754741Canada Ltd, Winnipeg (CA)

(72) Inventors: David Prystupa, Pinawa (CA); John Pacak, Winnipeg (CA); Robert Kozakewich, Winnipeg (CA)

(73) Assignee: 9754741 Canada Ltd., Winnipeg (CA)

( * ) Notice: Subject to any disclaimer, the term of this patent is extended or adjusted under 35 U.S.C. 154(b) by 0 days.

(21) Appl. No.: 17/038,792

(22) Filed: Sep. 30, 2020

(65) Prior Publication Data

US 2021/0016326 A1 Jan. 21, 2021

Related U.S. Application Data

(60) Continuation of application No. 16/568,893, filed on Sep. 12, 2019, now Pat. No. 10,933,447, which is a division of application No. 15/662,794, filed on Jul. 28, 2017, now Pat. No. 11,185,892.

(60) Provisional application No. 62/368,356, filed on Jul. 29, 2016.

(51) Int. Cl.
| | |
|---|---|
| *B07C 5/36* | (2006.01) |
| *B07B 13/16* | (2006.01) |
| *B65G 47/14* | (2006.01) |
| *A01C 1/08* | (2006.01) |
| *B07B 13/04* | (2006.01) |

(52) U.S. Cl.
CPC .................. *B07C 5/36* (2013.01); *A01C 1/08* (2013.01); *B07B 13/16* (2013.01); *B07C 5/362* (2013.01); *B65G 47/1435* (2013.01); *B65G 47/1457* (2013.01); *B07B 13/04* (2013.01); *B07C 2501/009* (2013.01)

(58) Field of Classification Search
CPC .... B07C 5/02; B07C 5/34; B07C 5/36; B07C 5/362; B07B 13/05; B07B 13/11; B07B 13/16; B65G 47/082; B65G 47/1407; B65G 47/1428; B65G 47/1435; B65G 47/1442; B65G 47/1457; B65G 47/1464
See application file for complete search history.

(56) References Cited

U.S. PATENT DOCUMENTS

| | | | | |
|---|---|---|---|---|
| 4,013,192 A | * | 3/1977 | Pillon ................ | B65G 47/1428 221/7 |
| 4,526,269 A | * | 7/1985 | Henderson ......... | B65G 47/1457 221/233 |

(Continued)

*Primary Examiner* — Joseph C Rodriguez
(74) *Attorney, Agent, or Firm* — Adrian D. Battison; Ade & Company Inc.; Ryan W. Dupuis

(57) ABSTRACT

Particles are sorted into paths based on a measurable parameter by forming them into a stream in at least one duct carried on a body rotating around an axis where the duct is shaped so that the particles are accelerated to cause the particles separated into the duct to be aligned one after another in a row in the duct. The parameter of the particles are measured in the aligned stream one after the other and the particles are directed into one of a plurality of paths as determined by the measurement. In one arrangement the body comprises a disk member having a front face facing a supply conduit and the duct lies in a radial plane of the disk member. In one arrangement the measurement of the parameter is carried out by one or more measurement devices either carried on the disk or outside the edge of the disk.

14 Claims, 12 Drawing Sheets

(56) References Cited

U.S. PATENT DOCUMENTS

| | | | | |
|---|---|---|---|---|
| 4,570,831 | A * | 2/1986 | Izumi | G01G 13/026 198/756 |
| 5,954,185 | A * | 9/1999 | Eshelman | B65G 47/1464 198/395 |
| 7,128,204 | B2 * | 10/2006 | Baranowski | G01G 19/393 222/161 |
| 9,989,342 | B1 * | 6/2018 | Lougeay | F42B 33/002 |
| 10,933,447 | B2 * | 3/2021 | Prystupa | B07C 5/36 |
| 2021/0276814 | A1 * | 9/2021 | Prystupa | B07B 13/16 |

* cited by examiner

METHOD AND APPARATUS FOR SINGULATING PARTICLES IN A STREAM

This application is a continuation of application Ser. No. 16/568,893 filed Sep. 12, 2019 which is a divisional of application Ser. No. 15/662,794 filed Jul. 28, 2017.

This application claims benefit under 35 USC 119(e) from Provisional application 62/368,356 filed Jul. 29, 2018.

The invention relates to a method of singulating particles so that an action can be carried out on the particles such as for detecting parameters of particles in the stream. This invention can be but is not necessarily used in a method and apparatus for sorting the particles after the singulation. The arrangement described hereinafter is primarily directed to sorting seeds or kernels based on an optical assessment of the particle for example to extract diseased seeds; but this invention can be applied to using any assessment method for detection of any parameter of the particle and sorting based on that parameter. Also this invention can be used for carrying out an operation on the particle when singulated for example for coating, sterilizing or supplementing the particle in the stream.

BACKGROUND OF THE INVENTION

Optical seed sorting machines in general have three subsystems: means to singulate or separate kernels; means to detect quality characteristics of kernel; and means to displace kernels with a positive or negative quality characteristic.

The most common singulation method in seed sorters is the waterfall method wherein seeds are discharged from a vibrating hopper and are accelerated by gravity along an inclined plane at a steep angle. The displacement due to gravity is quadratic with time, so a gap opens up between kernels that enter the system at slightly different times. In the commercial art, the slides are typically more than 1 m long. Seeds singulated by the waterfall method are discharged at random intervals and have a range of velocities. More deterministic systems use moving belts, cylinders, or plates with defined kernel positions. In one variety, kernels are temporarily confined within an indent on a belt or plate by gravity. In another variant, kernels are confined within an indent by centrifugal force. In yet another variant, kernels are engaged by suction to fixed positions on a plate, cylinder or belt.

Kernel properties are typically measured optically, but acoustic methods are also known in the literature. Optical methods can be classified as imaging and non-imaging. In imaging methods, one or more cameras capture images in two to four wavelength bands. Strobed illumination is typically used. These methods are subject to problems of synchronization between various measurements and enhancements have been proposed to aid synchronization. Non-imaging methods measure the collective properties of a large portion of a kernel. Examples include near infrared spectra and scattering.

Most prior art uses compressed air to eject kernels. Despite several technical advances, compressed air ejection is inaccurate, has a slow response rate, and is not energy efficient. In 2008, a system has been proposed that uses mechanical levers attached to a rotary voice coil which is more accurate and uses 10% of the energy that a compressed air system uses. However, the cycle time of a voice coil is comparable to the activation time for a compressed air ejector.

In one example, the invention herein can be used to detect and remove infected kernels from grain. Incident light is scattered by the kernel with an infected kernel reflecting and scattering quantitatively differently from a healthy kernel. The amplitude of the reflected and scattered light is measured by a detector, normalized to kernel area, and compared to a threshold value derived from statistical analysis of separate samples of known healthy and infected kernels. In the method as developed, when the amplitude is above a threshold value the kernel is considered "infected," when the scattered light falls below the threshold value, the kernel is considered "healthy." The threshold can be set so as to minimize the overall amount of mycotoxin in kernels deemed "healthy." "Infected" kernels are then separated from "healthy" kernels.

Although the invention is described and referred to specifically as it relates to a method and an apparatus to perform the method to detect and separate infected grain by comparison of the amplitude of scattered and reflected light, it will be understood that the principles of this invention are equally applicable to similar methods, devices, machines and structures for particle separation of any type. Accordingly, it will be understood that the invention is not limited to such methods, devices, machines and structures, for infected grain separation.

The invention is particularly applicable to Fusarium head blight which is endemic in all grain producing regions globally and infects cereal grains such as wheat. Infection rates vary from a few percent in regions with a dry climate to over 50% in regions with a moist climate. The severity of infection ranges from less than 1% FDK (Fusarium Damaged Kernels) to 100% FDK with values between 1% FDK and 5% FDK having the largest volumes. Mycotoxins associated with infected kernels reduce the commercial value. 1% infected kernels generally equilibrates to 1 part per million of mycotoxin, the current Canadian maximum for food, while the EU has a maximum of ½ part per million. Grain with more than 3% FDK is usually steeply discounted. As infected wheat has little or no commercial value, effective removal of mycotoxin has significant economic value. Wheat is graded in steps of maximum fusarium infected kernels at 0.25%, 0.5%, 1%, 1.5%, 2%, 5%, not all steps are present for each type of wheat, with increasing discounts at higher infection. In Canada more than 5% is graded "fusarium damage," more than 10% "commercial salvage," which depending on market conditions may be sold at very deep discount, or not at all. Mycotoxin content is currently reduced either by sieving the kernels as healthy kernels are larger than infected kernels, or by abrading (removing the kernel surface where the toxin is concentrated) at milling. As a rule of thumb, milling reduces mycotoxin by half at 2 ppm (to 1 ppm) by removing the outer layer of the kernel. Gravity tables are also used to separate kernels by density. Kernels are suspended in an air stream. Denser healthy kernels sink and less dense kernels float to the top. Empirically, sieving and gravity tables remove about 40% of FDK.

SUMMARY OF THE INVENTION

According to the invention there is provided a method for singulating particles comprising:

providing a supply of massed particles in a supply conduit;

rotating a rotary body around an axis;

the rotary body defining at least one duct extending from an inner end adjacent the axis outwardly to an outer end spaced at a greater radial distance outwardly from the axis than the inner end;

feeding the massed particles at the inner end of said at least one duct;

the inner end being arranged in an array adjacent the axis so that the supply conduit acts to deposit the particles at the inner end of said at least one duct for entry of the particles into the inner low velocity end and for separation of the stream of particles in the conduit into separate ones of said at least one duct;

said at least one duct being shaped and arranged so that the particles are accelerated as they pass from the inner end to the outer end so as to cause the particles separated into said at least one duct to be aligned one after another in a row in the duct as they move toward the outer end.

In many cases the method includes carrying out an operation on the singulated particles while they remain singulated. That operation can include merely looking at or counting the singulated particles. However the singulation is particularly effective for processing the singulated particles such as by coating, inoculating, sterilizing. In other cases the operation can include carrying out analysis or assessment of the particles. However in other cases the particles may be used in the singulated state such as in seeding where the singulation can be carried out at high speed into separate ducts for high speed seeding operations.

While the system can be effective for a single duct to generate a high speed stream of singulated particles, in many cases there is provided a plurality of ducts arranged in an array around the center feed conduit.

The method defined above can be used in a method for detecting at least one measurable parameter of a stream of particles comprising:

carrying particles in a stream of particles in a supply conduit;

rotating a rotary body around an axis;

the rotary body defining at least one duct extending from an inner end adjacent the axis outwardly to an outer end spaced at a greater radial distance outwardly from the axis than the inner end;

the inner end being arranged adjacent the axis so that the supply conduit acts to deposit the particles at the inner end of said at least one duct for entry of the particles into the inner end;

said at least one duct being shaped and arranged so that the particles are accelerated as they pass from the inner end to the outer end so as to cause the particles separated into the duct to be aligned one after another in a row in the duct as they move toward the outer end;

and for each of said at least one duct, measuring said at least one parameter of the particles.

In some cases the method is provided for sorting the particles so that, for each of the ducts, the particles are directed into one of a plurality of paths as determined by the measurement of the parameter. However the measurement of the parameter or parameters, which is obtained more effectively in view of the increased degree of singulation of the particles using the arrangement herein, can be used for other purposes.

The arrangement defined above therefore can provide an advantage that the increased velocity obtained by rotation of the body together with the increased acceleration of the particles on the body better separates each particle from the next for detection of the parameter. In addition the increased velocity of the particles can be used to increase the throughput of the system as the detection or measurement of the parameter can be carried out more quickly.

In one arrangement the measurement of the parameters is carried out while the particles are in the duct. This has the advantage that the location of the particles is more clear and defined since it is controlled by the rotation of the body and the position of the duct. In view of the more accurate location of the particle, the measurement of the parameter can in many cases be carried out more effectively.

In this case preferably the measurement of the parameter is carried out by a measurement device carried on the rotary body. In this way the measurement device is located at a specific position relative to the duct and relative therefore to the particles. This can simplify the operation of the measurement device since it can be focused more accurately on a specific location. In this case each duct may include one or more separate measurement devices dedicated to the measurement of the particles flowing through that duct. That is each particle when moving along a duct can pass a number of sensors or measurement devices, which may be aligned in a row, where each detects a different parameter of the particle to enable a better assessment of the particle to be made. However in some cases a single sensor can provide all of the required information.

Preferably, at least a portion of the duct proximate to the measurement devices is comprised of a transparent material. The provision of a portion of the duct as transparent allows the measurement to be carried out through the transparent section while the duct remains of a constant shape to continue to control movement of the particle.

In one arrangement, the walls of the ducts or the ducts themselves are segmented with one or more gaps between segments. One or more measurement devices are located proximate to the gaps to measure different parameters of the particle with a view unobstructed by the walls of the ducts. Where the duct itself is divided into separated segments, each segment is preferably arranged along the path of the duct substantially parallel to the average velocity vector of the particles at the location of said segment to minimize perturbation of particle flow along the duct. The particle can thus be operated upon using any of the techniques described herein while it is in the gap.

In another arrangement, the separation of the particles can be carried out using electrostatic forces where the particles are charged differentially according to selected parameters and then passed through a field so that the differential charging causes the particles to divert to different paths. Typically, an arrangement is provided which generates an equal charge on each particle so that particles of different mass are separated by passing those particles through a field which acts differentially on the particles based on their different masses since each particle has a different or unique charge per unit mass.

In an alternative arrangement the measurement of the parameters can be carried out by a plurality of measurement devices located in an annular zone surrounding the outer ends of the ducts so that the measurement is carried out after the particles are released from the ducts. This has the advantage that the measurement devices are or can be stationary in space with only the ducts on the rotary body rotating. This has the disadvantage that the specific location of the particle can vary over a larger range thus reducing the ability of the measuring device to be specifically focused. The measuring device therefore may need to carry out measurements in a wider area to accurately carry out the measurements wherever the particle is located in that area.

Preferably each measurement device is associated with a respective one of a plurality of separation devices each arranged for directing respective particles into one of a plurality of paths as determined by the measurement of the parameter by the associated measurement device. That is, each particle is detected and measured by the measurement device and that measurement is used to activate an associated separation device which diverts the particle into one of a plurality of separate paths depending upon its parameter.

In a preferred arrangement the measurement of the parameters is carried out by a plurality of measurement devices where the number of devices is equal to the number of ducts or there may be more than one device for each duct. That is each particle in each duct is independently measured using a separate measuring device for each of the ducts. However it will be appreciated that the ducts can be arranged to direct particles to measurement devices which are associated with a plurality of the ducts, providing the particles are properly spaced each from the next and properly directed. The measuring devices can include a plurality of separate measuring components, for example, X-ray, UV, visible, scattering, infrared, microwave and acoustic detectors.

In one arrangement the measurement device or devices and the particle separation device are both located on the rotary body. This ensures that the location of the particle is more specifically defined but requires that the operating components be mounted for rotation with the body.

In another arrangement there is provided an array of stationary particle separation devices arranged around the rotary body so that particles released from the outer ends of the ducts are operated upon by one of the separating devices depending upon an angular position of release of the particle from the outer ends of the ducts.

That is the particles can be unguided as they pass from the outer end of the ducts to the array of separating devices along a trajectory determined by the angular velocity of the rotary body and the direction of the duct at the outer end and wherein the associated detecting devices are located relative to the separating device to act on the particle in its trajectory.

In this arrangement there can be provided a guide member at the outer end of each duct which is operable for changing the trajectory as the particle is released from the rotary body.

Preferably each separating device is associated with a guide channel into which the particle enters when it is released from the outer end and the associated detecting device acts on the particle while it is in in the guide channel.

In one preferred arrangement the rotary body comprises a disk having a front face facing the supply conduit and the ducts lie in a radial plane of the disk and extend outwardly from the axis to a periphery of the disk. However other shapes and arrangements of the rotary body can be used. For example the body can be 3-dimensional with the channels or ducts also having a component extending in the Z-direction along the axis of rotation. This can be used to change the acceleration forces on the particles in the ducts as the particles move radially outwardly. In one preferred arrangement the shaping of the ducts is such that there is a first acceleration zone to accelerate the particles to cause the required separation which is then followed by a zone of no net acceleration. In a third section there may be a deceleration zone so as slow the particles as they approach the separation system or the collection system to reduce impact loads either during separation or as the particles are halted to a collection system. These zones can be obtained using shaping of the ducts in a 2-dimensional structure or in a 3-dimensional structure.

In the second zone, the path of the duct is arranged so that the inertial forces are balanced, on average, by friction so there is no net acceleration and the kernel spacing remains nearly constant. The advantage of a nearly constant velocity zone is that there is more time to make kernel measurements.

In some cases it may be advantageous to decrease particle velocity (deceleration) prior to separation or sorting, or after the action has been carried out, to minimize or eliminate damage from high velocity impacts. The magnitude of the decrease is limited by the requirement that the separating mechanism acting on kernel n needs time to return to a neutral position before kernel n+1 arrives. The gap between kernels can be reduced after measurement to the time for an ejection cycle. The purpose of the deceleration is for use of the system with particles which can be damaged at high velocity impacts. The need for deceleration must be balanced with the need for the degree of singulation required for the action and the need for the maximum throughput.

The velocity of a particle can be held nearly constant, after the acceleration to obtain the required singulation, by adjusting the rate of radial displacement along the path of a duct to balance frictional forces with inertial (centrifugal and Coriolis) forces.

Where the rotary body is a disk, preferably the ducts form channels with an open face facing toward the supply conduit. However other arrangements can be used in which the disk is not necessarily a complete solid structure but can be provided simply by those parts of a disk shaped body that are necessary to provide the ducts or conduits through which the particles pass. In one example the structure can be provided by a hub and spoke construction in which the particles are fed at the hub into ducts each defined by a respective one of the spokes. While typically the structure includes as many ducts as can be possibly formed into the structure to maximize the flow rate of the system by maximizing the number of ducts, in some cases the structure may include a very limited number of the ducts for example only one or two where high throughput is not required.

Preferably the ducts are curved so that the outer end is angularly retarded relative to the inner end. This shape typically follows closely the path of the particle as it is accelerated under centrifugal force and Coriolis force so that the particle can travel along the path without excessive friction against the sides of the duct.

Preferably the ducts are arranged immediately side by side at the inner ends adjacent the axis so that the feed conduit deposits the particles in the manner which separates the particles directly into the inner ends of the ducts, with the ducts increasing in spacing toward the outer ends as the ducts move toward areas of increased diameter on the rotary body.

In order to maximize the number of ducts, at the outer end of the ducts, preferably the ducts can include branches which separate the stream of particles into separate branch ducts to increase the number of outlets relative to the number of inlets, thus maximizing the number of outlets at the outer edge of the rotary body.

In another optional arrangement the ducts can be stacked one on top of another at the inner ends to maximize the number of inlets and are arranged in a common radial plane at the outer ends so that all of the outlets lie side by side in the radial plane at the outer edge of the rotary body.

In another optional arrangement each duct fed by the central feed conduit termed 'parent duct' may have one or more subsidiary ducts termed 'child duct'. Each child duct is fed by either the parent duct or another child duct. The child ducts run substantially parallel to the parent duct.

Particles pass from a first duct into a second duct through one or more passages in the wall(s) of the first duct that exert force on the particle. Each passage in the first duct is shaped to allow particles smaller than a threshold dimension to pass into the second duct. Particles larger than the threshold value are retained by the first duct. The passage functions as a size filter so that the discharge end of the parent duct conveys the largest particles and each subsequent child duct conveys progressively smaller particles. The child ducts may be associated with detectors and ejectors or other actions on the particles therein or may simply convey unwanted particles to a discard bin. In the case of grain kernels, child ducts may be used to convey less desirable particles such as immature seeds, broken seeds, weed seeds, and dirt.

Preferably the axis of the rotary body is vertical so that the disk lies in a horizontal plane. However other orientations can be used.

Preferably a side wall of each duct against which the particles run is inclined in a direction along the axis so that acceleration forces on the particles act to move the particles into a common radial plane for release from the rotary body. That is the acceleration forces tend to move the particles axially of the rotary body toward a common axial position. In this way, even if the particles enter the ducts at positions spaced along the axis, the shape of the duct brings them all to the same axial location.

In one preferred arrangement, each duct is shaped such that the acceleration causes the particle to move against a wall of the duct where the wall is V-shaped to confine the particle to a base of the V-shape. The wall can include a surface which includes rifling for engaging and rotating the particle in the duct. In addition the wall can include one or more openings at a location such that components smaller than the particles are separated from the particles by release through openings. Each duct can include an associated second duct parallel to the duct into which the separated smaller components enter. This can be used in a system where there is a stack of such ducts so that the particles are separated by size from the first.

In one example each separating device comprises a separating head having a front edge arranged such that the particles to be separated move toward the front edge in a stream and an actuator for moving the front edge between a first position on one side of the stream arranged to direct the particle to a second side of the stream, and a second position on a second side of the stream, arranged to direct the particle to said one side of the stream.

In this example preferably the separating head is arranged in a radial plane of the rotating body and the first and second sides are arranged on respective sides of the radial plane.

In this example preferably the separating head includes inclined guide surfaces on the first and second sides of the front edge so that the separating head is generally wedge shaped.

Preferably the actuator is moved by piezo electric members. However other drive forces can be used for example an electromagnetic voice coil.

Preferably the actuator is mounted in a tube which extends radially outward of the separating head and lies in a radial plane of the separating head.

In accordance with another important feature of the invention which can be used independently of other features, each separating device comprises a duct portion arranged such that the particles to be separated move through the duct portion in a stream and an actuator for moving a discharge end of the duct portion between at least two separate positions arranged to direct the particles to corresponding separate collection locations.

In this arrangement preferably the discharge end of the duct portion is moved to said first and second positons which are spaced axially of the rotary body. However other movements are possible provided the first and second positions allow the required separation into separate locations or into separate collecting channels.

In this arrangement preferably the duct portion is mounted on the rotary body for rotation therewith. However the movable duct portion can also be used with an embodiment in which the particles are directed into a duct portion after they leave the rotary body where the duct portion is moved to the separate positions depending upon the measurement that occurs.

In some cases the actuator is moved by piezo electric members. However more preferably, in order to provide the amount of force and movement necessary, the actuator is more typically an electromagnetic voice coil.

In accordance with another important feature of the invention which can be used independently of other features, each duct preferably includes a first portion arranged for separating the particles each from the next by acceleration and a second portion for measuring where the first and second portions are arranged such that the particle acceleration in the first portion is greater than that in the second portion. The intention is that in this method the second portion is arranged such that the particle acceleration in the second portion is low or close to zero to keep the particles at or close to constant velocity during measuring.

In accordance with another important feature of the invention which can be used independently of other features, preferably a further portion of the duct is provided in which the particle is decelerated to reduce its velocity for separation or, after the action has been completed, for collection of the particles. In this way it is possible to reduce the velocity of the particles sufficiently to avoid the impact damage, particularly where the particles are larger seeds such as peas or beans or berries which have a high mass and are relatively soft.

In one example the particle can be decelerated by a shape of the further portion of the duct which acts to decelerate the particles therein. That is the shape of the duct portion is arranged to counter the centrifugal forces accelerating the particle.

In another example the particle can be decelerated by an air stream located in the further portion such as by an air nozzle or the like.

In accordance with another important feature of the invention which can be used independently of other features, the particles when directed can be engaged by an impact surface which is arranged to impact the particles while reducing the impact loads thereon. For example the impact surface includes a resilient material to reduce the impact loads on the particle. However other arrangements such as the shaping of the impact surface can be used.

In accordance with another important feature of the invention which can be used independently of other features, there is provided a closure member for closing off access to one or more of the ducts from the supply conduit. This can be used in a situation where one or more of the ducts is closed off from the supply conduit so that only some of the ducts are available to be used when supply of particles from the supply conduit is low.

This closure feature is also useful to allow continued operation of a unit (at reduced capacity) when a diagnostic test shows that one of more of the measurement devices or ejectors is malfunctioning allowing the system to continue with the properly functioning ducts.

According to one aspect of the invention there is provided a method for sorting particles comprising:
  carrying particles to be sorted in a supply conduit;
  forming the particles from the supply conduit into a stream of the particles in a row;
  locating a particle separating device at the stream operable to direct each particle into one of a plurality of paths as determined by operation of the separating device;
  wherein each separating device comprises:
    a separating head having a front edge lying generally along the stream so that particles in the stream move toward the front edge;
    and an actuator for moving the front edge between a first position on a first side of the stream, arranged to direct the particle to a second side of the stream, and a second position on the second side of the stream, arranged to direct the particle to the first side of the stream.

According to one aspect of the invention there is provided a method for sorting particles comprising:
  carrying particles to be sorted in a supply conduit;
  forming the particles from the supply conduit into a stream of the particles in a row;
  locating a particle separating device at the stream operable to direct each particle into one of a plurality of paths as determined by operation of the separating device;
  wherein each separating device comprises an actuator for moving a separating component between a first position arranged to direct the particle to a first path, and a second position arranged to direct the particle to a second path;
  wherein the actuator is moved by a piezo electric member.

According to one aspect of the invention there is provided a method for sorting particles comprising:
  carrying particles to be sorted in a supply conduit;
  forming the particles from the supply conduit into a stream of the particles in a row;
  locating a particle separating device at the stream operable to direct each particle into one of a plurality of paths as determined by operation of the separating device;
  wherein each separating device comprises a duct portion arranged such that the particles to be separated move through the duct portion in a stream and an actuator for moving a discharge end of the duct portion between at least two separate positions arranged to direct the particles to corresponding separate collection locations.

According to one aspect of the invention there is provided a method for sorting particles comprising:
  carrying particles to be sorted in a supply conduit;
  forming the particles from the supply conduit into a stream of the particles in a row;
  locating a particle separating device at the stream operable to direct each particle into one of a plurality of paths as determined by operation of the separating device;
  wherein each particle passes through a first portion of a path arranged for separating the particles each from the next by acceleration and a second portion where the first and second portions are arranged such that the particle acceleration in the first portion is greater than that in the second portion.

According to one aspect of the invention there is provided a method for sorting particles comprising:
  carrying particles to be sorted in a supply conduit;
  forming the particles from the supply conduit into a stream of the particles in a row;
  locating a particle separating device at the stream operable to direct each particle into one of a plurality of paths as determined by operation of the separating device;
  and decelerating each particle to reduce its velocity to prevent particle damage.

According to one aspect of the invention there is provided a method for sorting particles comprising:
  carrying particles to be sorted in a supply conduit;
  forming the particles from the supply conduit into a plurality of separate streams of the particles in a row;
  locating a particle separating device at the stream operable to direct each particle into one of a plurality of paths as determined by operation of the separating device;
  including closing off access to one or more of the streams from the supply conduit.

In all of the above aspects, operation of the separating device is based on a measurement of a parameter of the particle measured in the path. However the separation device can be used in other situations where no measurement occurs.

The arrangement herein can include the possibility of measuring a quality parameter of a singulated particle, performing an operation on the singulated particle, and then measuring a quality parameter after the operation to determine a further operation. The cycle of measure and operate can happen several times. The arrangement herein can also include the possibility of performing an operation on the singulated particle, and then measuring a quality parameter after the operation to determine a further operation. The cycle of operate and measure can happen several times. The arrangement herein can also include the possibility of measuring a quality parameter of a singulated particle without an operation step. The arrangement herein can also include the possibility of performing an operation, or sequence of operations on the singulated particle without a measurement step.

That is some of the sequential operations can be the separation defined herein. The separation operation may be cascaded in multiple steps. For example a first measurement may be used to determine which of two or more subsequent paths the particle follows. Each path may have distinct further operations and measurements. The cycle may be repeated multiple times to produce a plurality of output steams. However other processes can be carried out in the same system such as coating of a particle or irradiation of a particle for sterilization. Singulation allows access to all particle surfaces for coating or irradiation. Without singulation, coatings may be inhomogeneous, or bridge between adjacent particles. Singulation can facilitate a superior coating process. Sterilization by UV radiation, for example is effective only on surfaces with a direct line of sight between the surface and radiation source. Shaded surfaces are not sterilized so singulation is critical to the effectiveness of a sterilization process. Each duct therefore may be associated with a plurality of sequential processes some or all of which are related to separation and some may relate to other processes on the particle. Some of the processes may operate on the particle to improve a measurement step at a subsequent station along the duct. In between some of the processes it may be necessary to decelerate and/or accelerate the particles.

Thus the invention may be used to control the flow of particles in a multi-step process and to customize the processing of each particle based on measured parameters. There may be a plurality of detection steps and a plurality of operations performed on the particle based on particle properties measured at each detection step. For example, the first step could be to detect and remove foreign material such as chaff and material remaining could flow further down a duct to a second detector that measures seed quality parameters. In another example, singulated seeds flowing along a duct may be given different coatings (fertilizer, fungicide, insecticide, pro-biotic, etc.) based on measured seed parameters. In another example, a dose of radiation, such as an electromagnetic radiation or a photonic treatment, can be applied to a particle flowing in a duct and this dose could be applied dependent on measured particle parameters. The electromagnetic radiation could be used to bake a natural product (microwave, infrared) or to control the degree of photo-polymerization in a bead (UV).

The multi-step process can also be carried out using a second rotating body which receives the particles from the first, such as an annular disk surrounding an inner disk which is then able to rotate at a different rate.

Sorting is usually done to segregate a heterogeneous feedstock into more homogeneous bins and then further processing can be done on the more homogeneous feedstock. Conceptually, the processing step can be done on the singulated particles.

In cases where a "soft landing" is desired to prevent impact damage to vulnerable particles, the particle may impact a curtain or brush with strips that can deform on a time scale commensurate with the impact period. The curtain may consist of water. In one embodiment a water meniscus is formed by a bin rotating about a common axis with the singulating apparatus. In another embodiment, the water curtain is a waterfall surrounding the singulating apparatus. These embodiments including a water curtain are preferred to minimize or eliminate damage to soft fruits such as blueberries or Saskatoons. Alternative arrangements for providing controlled deceleration of fragile particles such as berries include surfaces which smoothly and gradually turn the particles in a vertical direction from the horizontal plane of the ducts so that gravity against the upward moving particles reduces the velocity with low forces from deceleration. This effect can also be obtained by forming a rotating liquid meniscus in a disk surrounding the ducts so that the particles turn in the liquid upwardly out of the plane of the ducts. It will be appreciated that many particles depending on their structure require controlled deceleration either in the duct or downstream of the duct after the operation, such as measurement and separation, is complete and before the particles are collected. Various methods for the controlled deceleration can be provided and are describer herein.

The present invention is not limited to the type or size of particle concerned and may be operated with different particles or objects to be separated.

Berry fruits such as Saskatoons and blueberries have a short shelf life due to spoilage and need to be processed promptly following harvest. Spoiled and unripened berries are sorted out. The present invention provides a means to sort berries faster, which reduces spoilage and presents the consumer with a higher quality product.

In agriculture, crop yield is optimized by planting a specified number of seeds per unit area. Not all seeds produce viable plants. Extra seeds are planted to compensate for seeds that fail to germinate or fail to produce vigorous plants. The present invention can be used, typically on the seeding or planting apparatus, to sort seeds according to measured parameters related to viability so that seeds most likely to produce viable plants are planted and less viable seeds are used for other purposes. The present invention can be used to sort seeds according to size for compatibility with planting devices. The invention can be used to count seeds so that a specified number can be planted. The present invention can also be used provide a rapid stream of singulated seeds of known quality and number in a planting device. Because the number of singulated seeds per second provided by the present invention is much higher than prior art, a farmer can seed more acres per hour.

A mining operation produces ore, which is crushed to produce particles of similar size and then smelted. Typically, only a small fraction of the ore is a useful mineral and the rest is rejected as slag. There is a considerable energy investment to melt rock that eventually ends up as slag. The present invention provides a means to improve the energy efficiency of a mining operation. The minerals present in each ore particle vary and can be measured by various spectroscopic methods such as x-rays, Raman, and infrared. Particles containing more than a threshold concentration of useful minerals can be directed to a smelter and particles containing less than a threshold concentration of useful minerals can be directed to a refuse pile. The cost of melting the rejected particles is saved.

The invention can be applied to sorting colloidal particles, which are typically fabricated in a condensation process producing a distribution of sizes and shapes. The allowed electronic transitions in a metallic colloid depend sensitively on the size and shape of the colloid. The invention could be used to sort colloidal particles on the basis of size and shape or on the basis of absorption spectrum into homogeneous classes.

While the duct as described in some examples herein is typically a channel with upstanding sides formed in a disk, the duct can also be circular, oval, triangular or quadrilateral etc. or can be a partial tube that is generally C-shaped, V-shaped or L-shaped). The duct can also be defined by a minimal two or three dimensional surface, or surfaces defined by the points of contact imparting force on the particles. The duct can also be an enclosed tube of many different cross-sectional shapes such as circular, oval, triangular or quadrilateral.

Embodiments of the current art are capable of achieving a rate of approximately 100 kernels per second per channel with good accuracy and approximately 200 kernels per second with poor accuracy.

The arrangement as described hereinafter may provide the objects to increase the kernel rate, reduce the size of equipment, and reduce the energy requirement.

BRIEF DESCRIPTION OF THE DRAWINGS

One embodiment of the invention will now be described in conjunction with the accompanying drawings in which.

DETAILED DESCRIPTION

Figure 1:
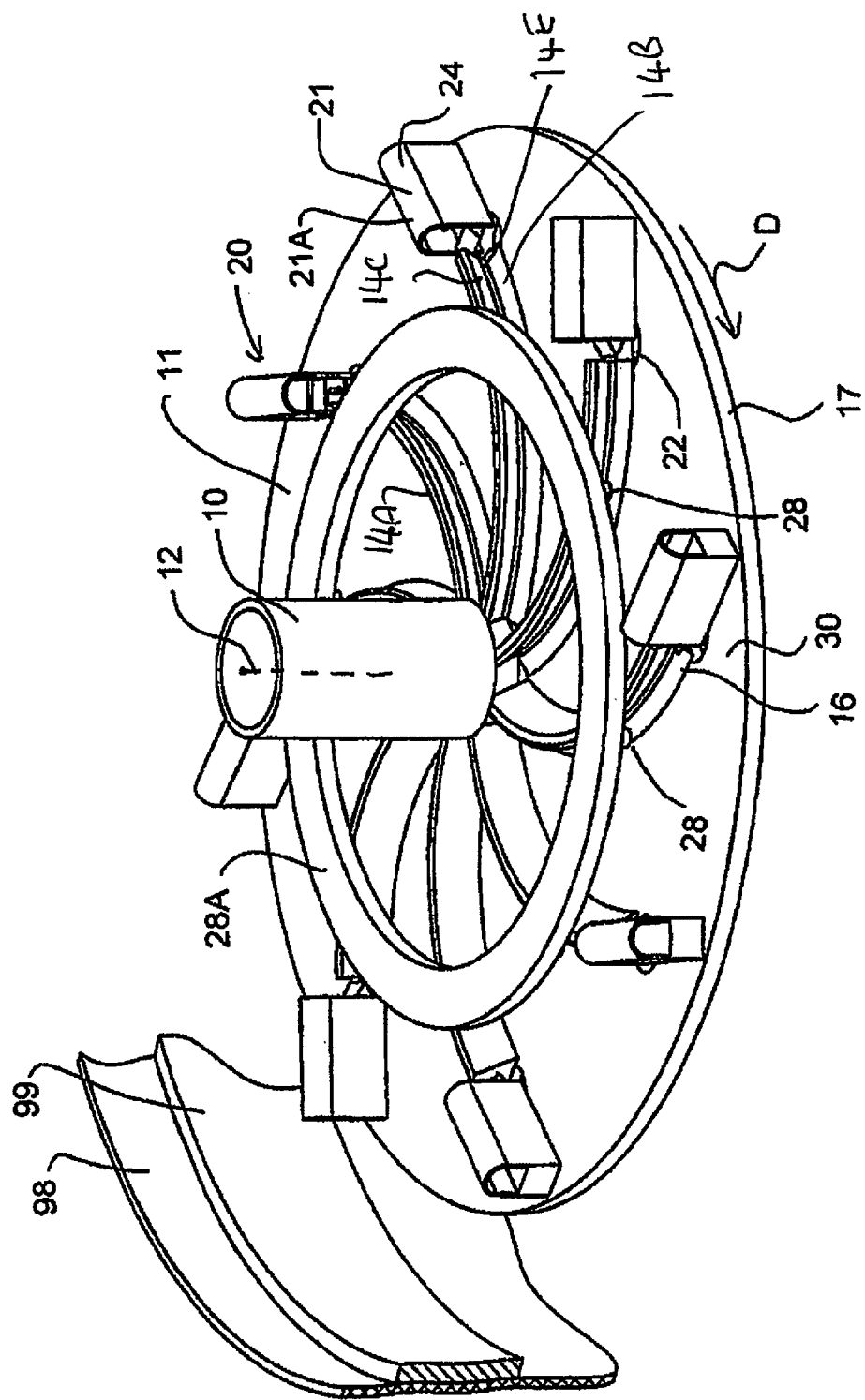
FIG. 1 is an isometric view of a grain sorting apparatus showing a method of particle singulation according to the present invention.
Figure 2:
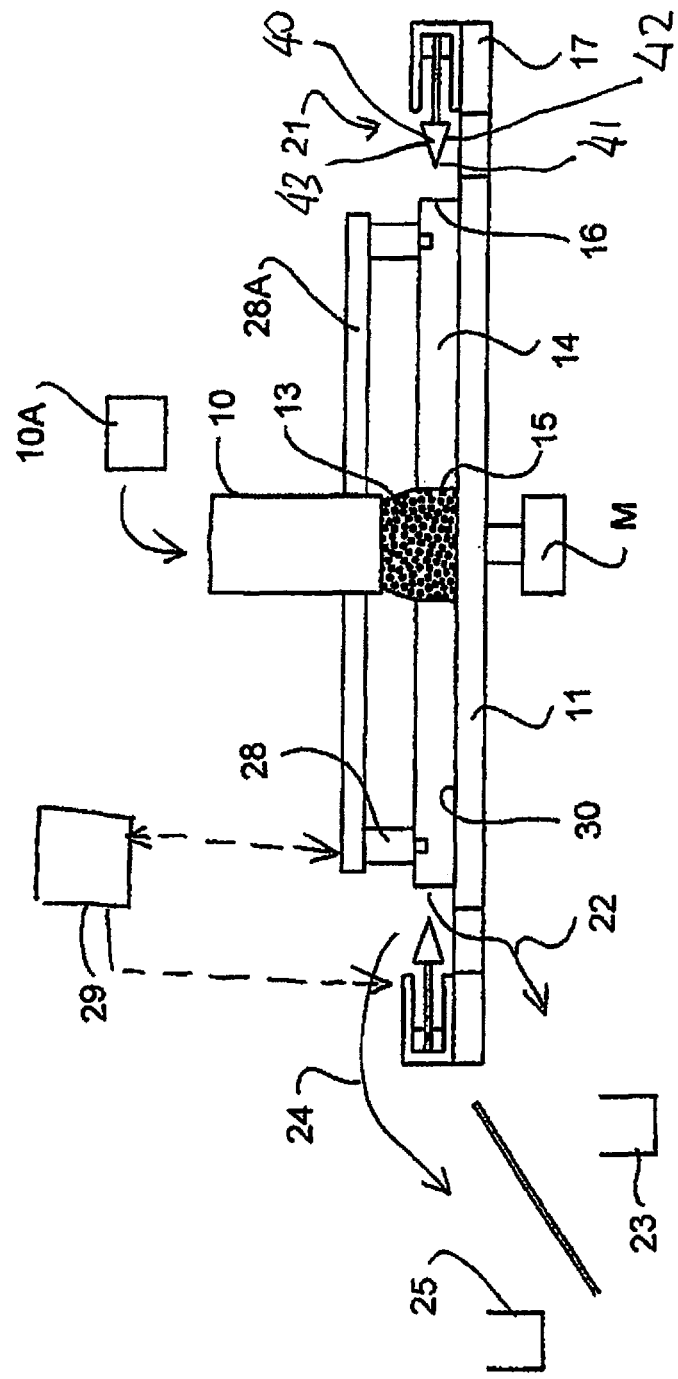
FIG. 2 is a vertical cross-sectional view through the apparatus of FIG. 1.

The apparatus for sorting particles based on a measurable parameter of the particles shown in FIGS. 1 and 2 comprises a supply conduit 10 carrying particles to be sorted from a feed supply 10A which supplies the particles in a continuous stream for presentation through the conduit to a rotary body 11 rotatable around an axis 12. In the embodiment shown the rotary body is a flat disk with the axis 12 arranged vertical so that the disk provides an upper horizontal surface onto which the particles 13 are supplied in the stream from the conduit 10. The conduit is arranged at the centre of the disk so that the particles are deposited onto the centre of the position where the disk is rotating but where there is little outward velocity. The kernel velocity at this point is from the flow in the supply conduit 10. The velocity at a point on the disk is v=wr where w is the angular velocity and r is the radius. If kernels are deposited in a region where the change in velocity is too high, they bounce and the flow is chaotic. Kernels are deposited in the central region to minimize the change in velocity.

On the upper surface of the disk forming the rotary body is provided a plurality of ducts 14 each extending from an inner end 15 adjacent the axis outwardly to an outer end 16 spaced at a greater radial distance outwardly from the axis than the inner end. In this embodiment the outer end 16 of the ducts is arranged adjacent to but spaced inwardly from the edge 17 of the disk 11. In this embodiment each duct 14 extends from a position closely adjacent the centre to the periphery 17 of the disk so that the centre the ducts are arranged immediately side by side and the ducts diverge outwardly so that at the outer end 16 they are spaced around the periphery 17.

The inner ends 15 are thus arranged in an array adjacent to the axis so that the supply conduit 10 acts to deposit the particles to be sorted at the inner ends 15 of the ducts for entry of the particles to be sorted into the inner ends. As the inner ends are immediately adjacent at the centre of the disk, the particles there form a pile at the centre which is automatically sorted evenly in to the open mouths of the ducts at their inner ends. Assuming a continuous pile of the particles at the centre, the rotation of the disk will act to evenly sort the particles into the individual ducts in a stream defined by the dimensions of the mouth relative to the dimensions of the particles. At the outset of the path along the duct, the particles will be immediately adjacent or overlapping. However passage of the particles along the duct while they are accelerated by the centrifugal forces will act to spread the particles each from the next to form a line of particles with no overlap. As the forces increase with increasing radial distance from the axis 12, the particles will be increasingly accelerated and thus the distance between particles will increase along the length of the duct. The kernels align with the duct axially in the first part of the duct and the kernel length defines an initial center to center spacing with some variation due to differences in kernel size. The centrifugal acceleration is uniform at a given radius, but the frictional forces for grain kernels vary by about 20%. The frictional forces scale with the Coriolis force=uN (u=coefficient of friction approximately 0.2-0.25, N=normal force to duct wall supplied primarily by the Coriolis force. As set out above, the duct can be shaped to minimize the normal force and friction by curving the duct along the line of net force (mentioned in text earlier). Conversely, the particle acceleration can be reduced by curving the duct to increase normal forces, curving the duct to constant or even decreasing radius, or increasing the coefficient of friction of a selected portion of a duct by changing the texture and/or material.

Selection of the length of the duct relative to the size of the particles can be made so that the spacing between each particle and the particle behind can be selected to be a proportion of the length of the particles. In the example where the separator is used for seeds, the separation between each seed and the next can be at least equal to the length of the seeds and typically 1.5 or 2.0 times the length of the seed.

Thus the ducts are shaped and arranged so that the particles are accelerated as they pass from the inner end to the outer end so as to cause the particles to be aligned one after the other in a row as they move toward the outer end.

The outer ends 16 are arranged in an angularly spaced array at an outer periphery of the rotary body so that the particles of the row of particles in each duct are released by centrifugal force from the disk outwardly from the axis of the disk. The openings all lie in a common radial plane of the disk. The ducts can be formed either as grooves cut into the upper surface of a thicker disk or by additional walls applied on to the top surface of the disk, or two-dimensional and/or three-dimensional shaped guides.

An array 20 of particle separating devices 21 is arranged in an annulus at the outer edge 17 of the disk so that the individual separating devices 21 are arranged at angularly spaced positions around the disk.

Figure 3A:
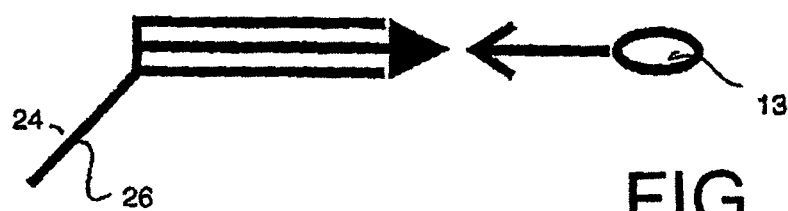
FIGS. 3A, 3B and 3C show vertical cross-sectional views through the separating device of the apparatus of FIGS. 1 and 2.
Figure 3B:
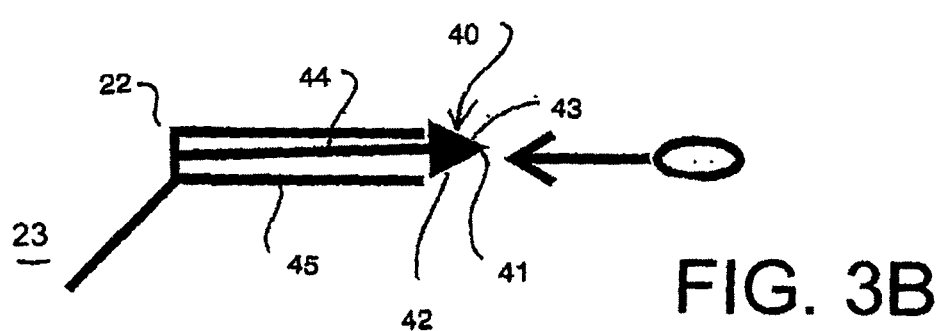
Figure 3C:
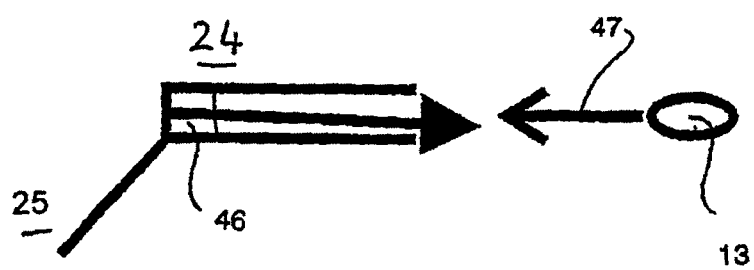

Each separating device is operable to direct each particle into one of a plurality of paths as determined by operation of the separating devices. In the example shown the separating devices are arranged to direct the particles upwardly or downwardly relative to the plane of the outlets 16. As shown in FIG. 2 and the FIG. 3A the separating device 21 can take up an initial intermediate or starting position where the particles are not separated to one direction or the other. As shown in FIG. 3B, the separating device can be moved upwardly so as to direct the particles downwardly into a path 22 for collection within a collecting chamber 23. Similarly when the separating device is moved to a lowered position as shown in FIG. 3C, the particles are moved upwardly over the top of the separating device along a path 24 for collection within a chamber 25. The two paths 22 and 24 are separated by a guide plate 26 which ensures that the particles move to one or other of the chambers 23, 25.

In order to control the separating devices 21, there is provided a measuring system generally indicated at 28 which is used to measure a selected parameter or parameters of the particles as those particles move from the end of the duct at the edge of the disk toward the separating devices. The measuring devices are carried on a mounting ring 28A.

The measuring system can be of any suitable type known in this industry for example optical measuring systems which detect certain optical characteristics of the particles to determine the particular parameters required to be measured. Other measuring systems can also be used since the type of system to be used and the parameters to be selected are not part of the present invention.

In a typical example, the analysis of the particles relates to the presence of degradation of the seed due to disease and this can often be detected optically for example using the systems and disclosed in the prior U.S. Pat. No. 8,227,719 of the present inventor, the disclosure of which is incorporated herein by reference or may be referenced for further detail.

Each separating device 21 is associated with a respective detecting device 28, which may include multiple detecting components, operable to measure the parameter of the particles and in response to the parameters measured by the associated detecting device, the respective or separating device is operated to select the path 22 or the path 24.

It will be appreciated that the number of paths can be modified to include more than two paths if required depending upon the parameters to be measured. Such selection to an increased number of paths can be carried out by providing subsequent separating devices 21 positioned downstream of the initial separation. In this way one or both of the paths can be divided into two or more subsidiary paths with all of the separating devices being controlled by a control system 29 receiving the data from the measuring device is 28.

The disk 11 thus has a front face 30 facing the supply conduit and the ducts 14 lie in a radial plane of the disk and extend outwardly from the axis to a periphery 17 of the disk 11.

Figure 4:
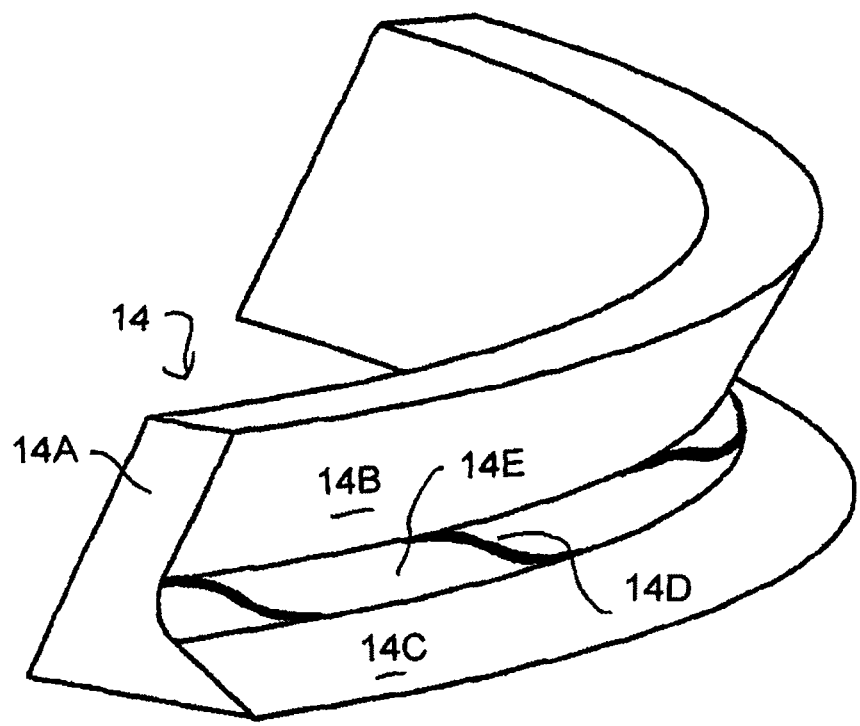
FIG. 4 is a partial isometric view showing the shape of one of the grooves or ducts of the apparatus of FIG. 1.

As shown in FIGS. 1 and 4, the ducts 14 form a standing wall 14A with an open face facing toward the supply conduit 10 and transversely across the disk. The wall 14A defines a V-shaped cross-section with two sides 14B and 14C converging an apex 14E at which is provided rifling 14D. However the ducts may be closed at the top surface with only the mouth 15 and the discharge end 16 open.

As shown in FIG. 1, the ducts 14 are curved so that the outer end 16 is angularly retarded relative to the inner end 15. This forms a side surface 14B of each duct as best shown in FIG. 4 which is angularly retarded relative to the direction of rotation in the counter clockwise direction as shown at D. This curvature of the ducts is arranged to follow substantially the Coriolis and centrifugal forces so that the particles follow along the duct without excessive pressure against either side wall of the duct. However the shape of the duct is arranged so that the Coriolis forces tend to drive the particle against the downstream side 14B of the duct 14. As shown in FIG. 4, the sidewall 14B is inclined so that the force F on the particle pushes the particle against the inclined wall driving the particle toward the apex 14E of the duct 14. This acts to bring all the particles toward the apex 14E of the duct so the particles emerge from the disk at a radial plane of the apexes 14E of the ducts 14.

As shown in FIGS. 1 and 4, the wall 14B includes rifling 14D formed as grooves or ribs running along the sidewall so that as the particles roll over the surface from an upper edge of the surface to the bottom wall, the particles are rotated around a longitudinal axis of the particles both tending to align the particles with their longer axes longitudinal of the wall and also tending to spin the particles around this longitudinal axis. The rifling grooves or ribs shown in FIG. 4 are segments of generally helical paths that intersect the duct surfaces. The helical pitch regulates the particle spin. In this way, as the particles slide along the surface from the inlet 15 to the exit 16, the particles move toward the apex of the surface and rotate around their axes to properly orient the particles and the impart spin or rotation. As the particles emerge from the discharge 16, these particles are therefore aligned in a common radial plane, aligned with their longitudinal axes along the duct and with some spin as they emerge for better analysis of the particles by the detection system 28. The rotation allows different surfaces of the particles to be presented to the detection system 28 to obtain averaging of the surface characteristics. At the same time the particles are presented in a common orientation.

As shown best in FIG. 1, the ducts 14 are immediately side by side at the inner ends 15 adjacent the axis and increase in spacing toward the outer ends 16. At the inner ends 15 the ducts are immediately side by side so that the maximum number of ducts is provided by the maximum number of openings 15. The number of ducts can be increased, in an arrangement not shown, where the ducts include branches so that each duct divides along its length into one or more branches.

In another arrangement not shown the ducts can be stacked one on top of another at the inner ends 15 to increase the number of the duct openings at the inner end. That is for example, if three rings of ducts are stacked one on top of another, the total number of ducts can be increased threefold. The ducts then are arranged in a common radial plane at the outer ends by the uppermost ducts moving downwardly when space becomes available at the outer edge to accommodate the three rings of ducts in a common plane. In this way the outer ends 16 of the ducts can be arranged directly side by side at or adjacent the periphery 17 of the disk.

In the embodiment of FIGS. 1 and 2, the detection device 28 and the separating device 21 are both located within the periphery 17 of the disk. In this way the particles are guided as they pass from the outer end of the ducts to the array of separating devices.

Figure 5:
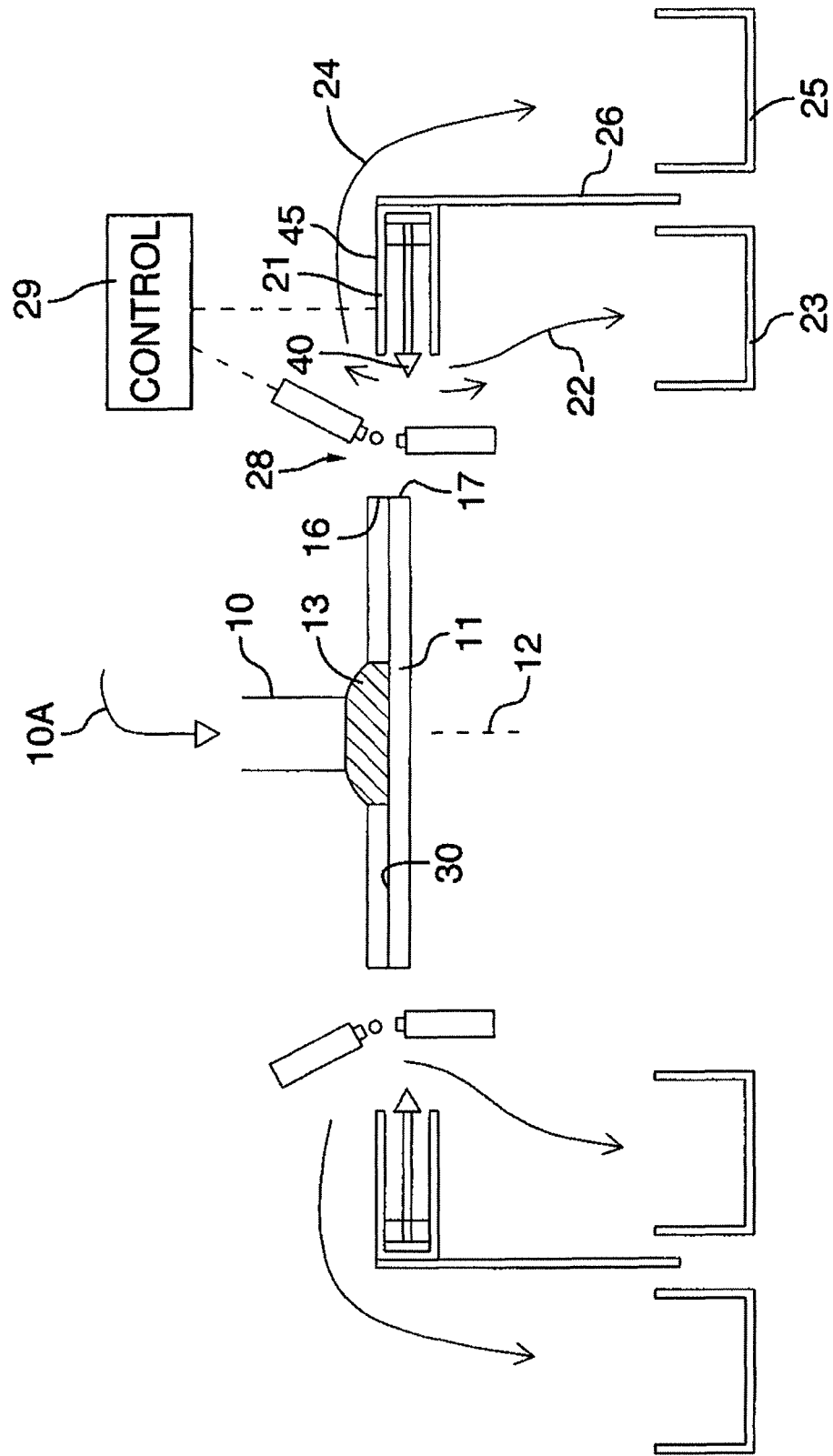
FIG. 5 is a vertical cross-sectional view a second embodiment of an apparatus using a method according to the present invention.

In FIG. 5 is shown an alternative arrangement where the separating devices 21 are beyond the periphery 17 of the disk. In this embodiment, the particles travel along a trajectory determined by the angular velocity of the disk 11 and the direction of the duct 14 at the outer end 16. The associated detecting devices 28 are located relative to the separating device 21 to act on the particle in its trajectory. That is, the trajectory is arranged in the free space between the outer periphery 17 and the separating device 21 so that a particle exiting the discharge end 16 of a duct travels past one of the detecting devices 28 depending upon its position of release and from that detecting device the particle moves to an associated separating device 21 which acts to separate depending upon the analysis carried out by its associated detecting device 28. It is necessary therefore the trajectories are consistent and ensure that the particle that is detected is moved to the requisite separating device.

If required there is provided a movable guide member (not shown) at the outer end of each duct for changing the trajectory with the guide member forming a guide surface which can be rigid or flexible which changes orientation in an angular direction to direct particles to the nearest detector and associated separator as the disk and the ducts thereon rotates and moves from one detector to the next.

In another arrangement, not shown, instead of using the particle trajectory to control movement of the particle past the required detecting device and associated separating device, each separating device 21 is associated with a guide channel into which the particle enters when it is released from the outer end 16 and the associated detecting device 28 acts on the particle in the guide channel.

In another arrangement not shown, both the detecting devices and the separating devices are mounted on the disc for rotation with the ducts. In this way the separating device is directly associated with a respective one of the ducts to ensure that the particles travelling in the duct move past the associated detecting device and from that detecting device directly to the separating device to ensure accurate separation without the possibility of errors caused by differences in trajectory of the arrangement of FIG. 5. Again the separating devices act to separate the particles, depending upon their detected characteristics in to a path or separated by a guide. In this arrangement the path is through an opening in the disk.

As best shown in the FIGS. 2, 3A, 3B and 3C, each separating device 21 comprises a separating head 40 having a front edge 41 lying generally in a radial plane of the disk 11 so that particles released from the outer ends 16 move toward the front edge 41. The separating head 40 includes the inclined guide surfaces 42 and 43 on respective sides of the front edge 41. In this way the separating head 40 is generally wedge shaped. The separating head is mounted on a lever 44 mounted inside a tube 45 so that the lever and the actuating mechanism for the lever are protected inside the tube which is located behind and protected by the separator head. An actuator 46 is provided for moving the front edge 41 between first and second positions above and below the radial plane 47 defined by the path of the particle 13. Thus in FIGS. 2 and 3A a central and neutral position is shown. In FIG. 3B the front edge 41 has moved upwardly which is arranged to direct the particle to a side of the radial plane below the radial plane. In the position shown in FIG. 3C, the front edge is moved downwardly to a second side of the radial plane and is arranged to direct the particle to the first or upper side of the radial plane. This movement of the wedge shaped head and its front edge requires little movement of the front edge 41 and uses the momentum of the particle itself to cause the separation simply by the particle sliding over the guide surfaces 42 and 43. The separation head therefore does not need to move into impact with the particle or to generate transverse forces on the particle since the head merely needs to move into position allowing the particle to generate the required separation forces.

In view of the provision of the lever, the actuator 46 required to generate only small distance movements and hence can be moved by piezo electric members. Alternatively the movements can be carried out by a small electromagnetic coil. This design allows the use of components which can generate the necessary high-speed action to take up the two positions of FIGS. 3B and 3C sufficiently quickly to accommodate high-speed movement of the particles. As shown the actuator 46 is located outward of the separating head and lies in a radial plane of the separating head.

The arrangement of the present invention therefore provides a system for separation of the particles, for example kernels, where the particles are supplied in a feed zone and are separated by the ducts and the inlet of the ducts so as to form a plurality of streams of the particles.

The flow rate of the feed tube 10 is determined by its narrowest waist and this can be controlled to provide a suitable flow rate for the particles. The kernels fill the central zone at the centre of the disk and flow radially into the channels in an alignment zone. The removal rate of the particles along the ducts is arranged by selection of dimensions and rotation rate to be equal to the feed rate supplied by the feed duct 10. The flow satisfies the continuity equation $P1V1=P2V2$ where P1 and P2 are the kernel number densities and the V1 and V2 are the kernel velocities. The average centre to centre separation between kernels is proportional to V.

A second constraint is provided by the width of the ducts 14 where the channel width is selected so as to avoid kernel blockages. Thus the channel width is preferably greater than the kernel length to avoid a blockage. Where the channel width is greater than 1.5 times the kernel length, the kernels can flow without constriction. In this way the number of channels times the width of the channel may be approximately equal to the feed tube diameter. However, the channels do not need to start at the feed tube diameter. In general, there can be a flat zone with diameter greater than that of the feed tube diameter before the start of the channel.

A further constraint relates to the allowable difference in velocity between the disk 11 proximate to the feed duct 10 and the feed duct 10 itself. The difference in velocity between the feed and the disk at the feed zone radius must be less than 2 m/s and preferably less than 1 m/s for wheat kernels. The allowable difference in velocity in general varies with the type of particle to be singulated. Kernels with large Delta v bounce up from the disk. A larger velocity can be tolerated in an arrangement where a cover is provided over the disk at the central feed location. A small initial velocity from the feed tube is desirable to aid movement from the feed zone to the alignment zone. If the initial velocity is too large, the kernels bounce up. The initial velocity is regulated by the vertical separation between the feed tube and the disk 11. A central cone may be provided to assist in the directing the material outwardly at the center away from the axis.

In the alignment zone provided by the ducts, kernels flow from the feed zone into the channels. The flow is promoted by centrifugal force which in this zone is close to 1 G. Initially the kernels are close packed. As kernels gain radial velocity, the average separation increases and the Coriolis force, typically 1 to 3 G, proportional to the radial velocity is exerted on the kernels. The Coriolis force causes kernels to align end-to-end along the downstream or trailing side wall of the channel or duct. The kernels experience a drag force due to friction from the side wall proportional to the vector sum of gravity and Coriolis forces. The coefficient of friction is minimized or reduced by fabricating the disk from a smooth abrasion resistant material. Preferably the sidewalls of the ducts are curved or inclined in the vertical direction so that the kernels move into a common radial plane in the Z direction due to the Coriolis force along the sidewall of the channel.

In the acceleration zone the spacing between kernels increases as the kernels are accelerated by centrifugal force. As shown the ducts are curved so that the Coriolis force also contributes to kernel acceleration. The sidewalls of the channel are manufactured from a smooth hard material to minimize the friction and wear. The net force on each kernel is typically much greater than 1 G and increases rapidly with radial displacement. In one example, in a disk of 220 mm diameter spinning at 400 rpm the maximum force is approximately 44 G. Aerodynamic drag forces on the kernels become important with increasing velocity, ultimately setting a terminal velocity between 8 m/s and 9 m/s. Higher velocities can be achieved if the ambient pressure is lowered at the disk by a vacuum pump or the region surrounding the disk is filled with a gas less dense than air such as helium. A difference in pressure can be used to increase the flow rate in the feed tube while the same time increasing the terminal velocity. Ignoring frictional forces, the final velocity of the kernel leaving the peripheral edge 17 of the disk is equal to the angular velocity of the disk times the disk radius.

In respect of the rate of kernels passing the detector 28, it is desirable to have a centre to centre separation sufficient to allow ejection of one kernel without influencing the trajectory of the following kernel. By the continuity equation given above, a separation of two wheat kernel lengths corresponds with a kernel rate of approximately 80 kernels per second for every 1 m/s of kernel velocity.

The detection of the characteristics of the kernels is not a part of the present invention and hence is not described in detail. Many different sensing systems can be used using different techniques and the different characteristics of the particle.

In one example an optical system is used where a sampling region is illuminated with suitable light characteristics. Reflected light is received from the particle under investigation as the particle travels through the sampling region. The reflected light can be analysed for different characteristics at different wavelengths. The analysis can be carried out by a spectrometer.

As described above, the kernels are deflected by a mechanical lever. In one embodiment, the mechanical lever may be attached to a rotary voice coil. In a preferred embodiment, the mechanical lever is driven by a piezoelectric transducer. In one embodiment, a piezoelectric stack produces a small displacement which is amplified by leverage. In a preferred embodiment, the piezoelectric transducer is a bimorph. The wedge head 40 with an apex angle of between 20 and 45 degrees is mounted on the end of the bimorph. More preferably the apex angle is between 30 and 35 degrees. Kernels are directed toward the front edge of the wedge shaped head by the singulation apparatus. When voltage is applied to the bimorph, the wedge is deflected away from its central resting position. If the sign of the voltage is reversed, the direction of deflection is reversed. A bimorph 40 mm long can produce about 2 mm of displacement. A bimorph can be driven significantly faster than other types of ejectors. A shorter response time at the ejector allows a higher kernel rate.

Figure 7:
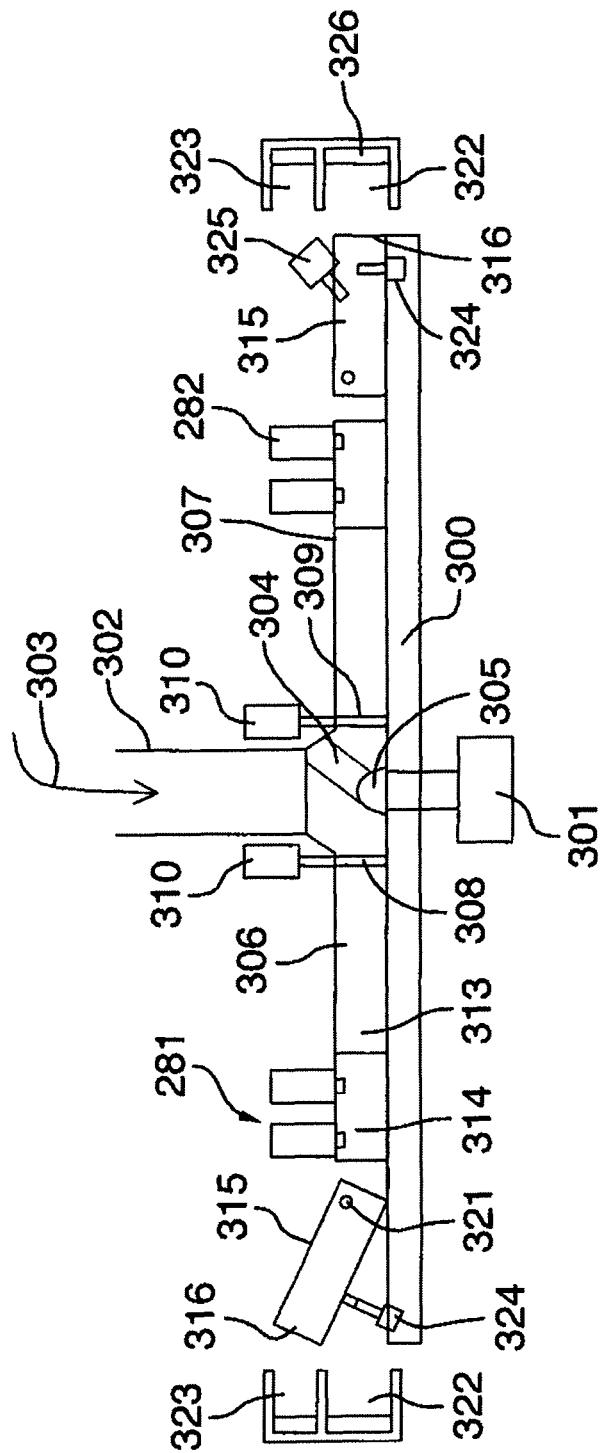
FIG. 7 is a vertical cross-sectional view a second embodiment of the apparatus using a method according to the present invention.
Figure 8:
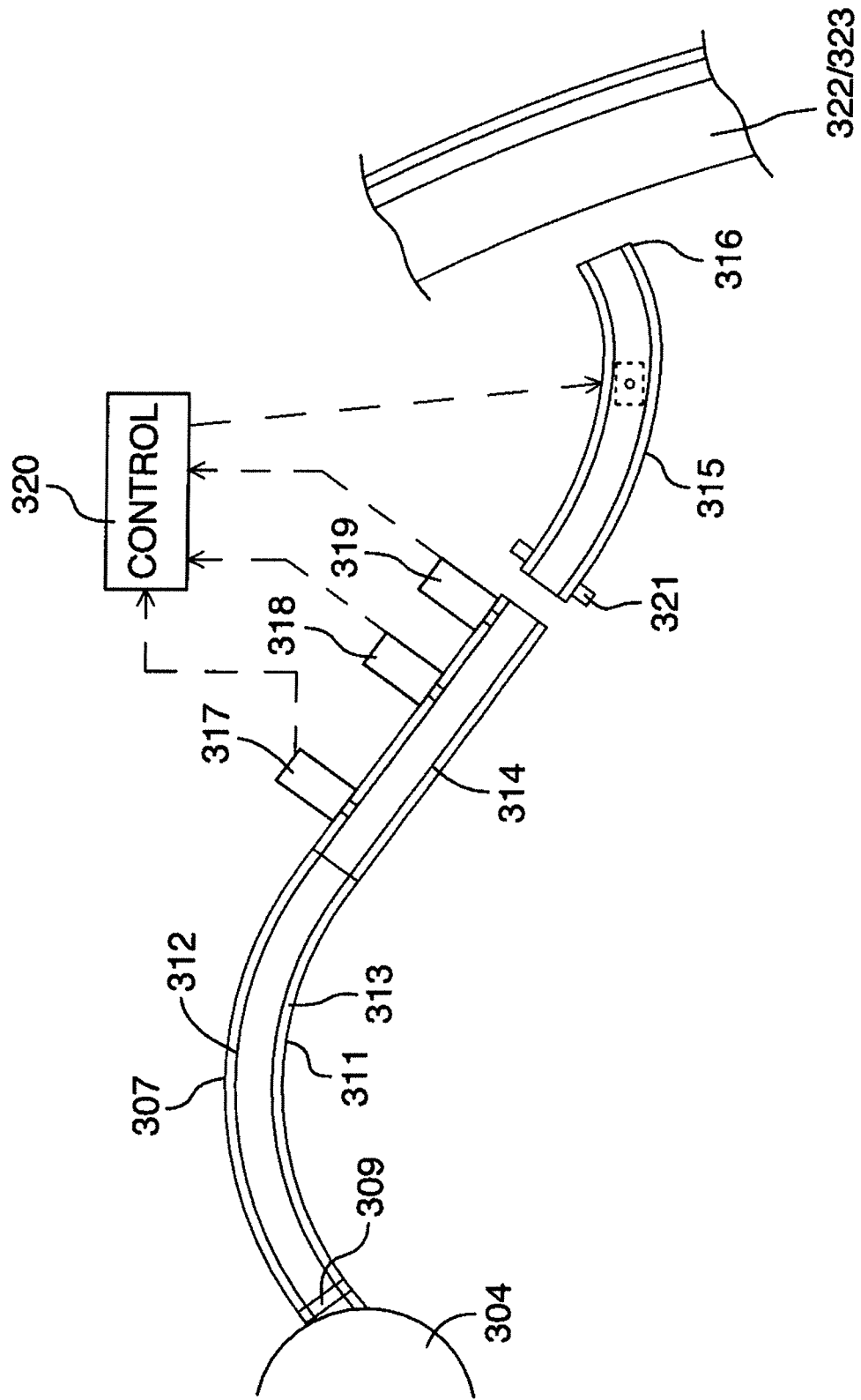
FIG. 8 is a plan view of the embodiment of FIG. 7 showing only one of the ducts.

Turning to FIGS. 7 and 8, there is shown a further embodiment including a disk 300 driven by a motor 301. A feed conduit 302 supplies the particulate material along a path 303 to a feed location 304 where the particular material is dropped onto the upper surface of the disk 300. A central cone or dome portion 305 is located directly under the conduit 302 so as to assist in spreading the material outwardly into the plurality of ducts 306, 307, the number of which of course is variable from minimum of one up to the maximum number which can be obtained within the area available. Particularly when there is a large number of ducts, there is provided a gate 308, 309 each of which is positioned out the inlet to the respective duct so as to control the flow of the particular material into the ducts. In this way when the quantity of feed material is relatively low, some of the ducts can be closed off by operating an actuator 310 driving the respective gate.

Each duct is formed by a channel with two generally upstanding sidewalls 311 and 312 between which the particles pass. These may be vertical, but more likely have "inclined" sidewalls as described previously. Also, depending on the item being sorted and the geometry of the rotary body, this duct can be a tube (circular, oval, triangular or quadrilateral etc.) or a partial tube i.e. C-shaped, L-shaped, V-shaped, or a minimal two-dimensional and/or three-dimensional shape following the path(s) where force is exerted on a particle by the duct.

Each duct such as the duct 307 shown in FIG. 8 includes a first portion 313, a second portion 314 and the third portion 315 at spaced positions along the length of the duct leading to a discharge mouth 316 at the end of the duct opposite from the gate 309. The first portion 313 of the duct is shaped and arranged so as to provide acceleration of the particles after entering through the gate 309 so as to separate the particles of each from the next longitudinally along the length of the duct portion.

The second duct portion 314 includes one or more sensors 317, 318, 319 at spaced positions along the length of the duct portion 314. The sensors can be used to measure different characteristics of the particles passing through the duct portion 314 so that a control device 320 which receives the signals from the sensors can direct the separation system for separating the particles within the duct.

The second duct portion 314 is shaped and arranged so as to provide a reduced acceleration of the particles within the second duct portion. Preferably the arrangement is such that in the second duct portion there is a very low or zero acceleration of the particles so that they maintain a nearly constant velocity through the second duct portion as they pass the sensors. This can be achieved, for example by setting the friction in the second duct region to balance centrifugal acceleration. Alternately or in combination with friction, the centrifugal acceleration can be reduced by arranging the second duct portion along a curve of nearly constant radial distance from the axis of rotation.

The third duct portion 315 acts as a separation system in that duct portion 315 is pivotal about a mounting pin 321 so as to move the discharge end 316 between at least two separate positions. In the position shown on the right end at the duct 307, the discharge opening 316 lies in the same plane as the disk and directs the particles exiting this discharge opening into a first channel 322 for collection as a set of the particles having a first characteristic measured by the sensors. A second channel 323 is provided for receiving the particles in the second position of the duct portion 315 as shown at the left end of FIG. 8 in respect of duct 306.

Thus it will be noted that the duct portion 315 is moved between the first and second positions of the channels 322 and 323 by an actuator 324 which lifts the discharge end 316 upwardly and downwardly between the channels 322 and 323. Typically the actuator 324 is an electromagnetic voice coil which provides sufficient force and movement to lift the duct portion 315 between the two positions.

As shown, in this embodiment the third duct portion 315 forms a part of the main duct 306 or 307 and is carried on the disc 300 for rotation therewith.

The third duct portion 315 as shown is also shaped differently from the first and second duct portions in a manner which causes a deceleration of the particles passing therethrough. Thus the particles as they emerge from the discharge end 316 are at a velocity which is reduced relative to the velocity during the measurement stage so as to reduce the possibility of impact damage after the particles leave the discharge end. It should be noted that the desired velocity profile through the duct is depends on the material properties. For some materials, the third duct portion may be shaped to provide an increase in velocity. As an alternative, the third duct portion can be replaced by an inclined gate which can be rigid but more preferably is flexible and curved so as to apply lower redirecting forces on the particles.

In addition to or instead, the particles within the duct portion 314 can be decelerated by an airstream directed along the duct tending to slow the movement of the particles. Again this is used to decelerate the particles to prevent or reduce impact damage from when the particles leave the opening 316.

In addition to or instead, the particles within the duct portion 314 can be decelerated by a water curtain such as a waterfall or meniscus as previously described.

In addition to or instead, impact damage can be reduced by providing a resilient layer 326 on the surface of the channel 322, 323 against which the particles impact when they leave the discharge opening 316. In one example the layer 326 is a resilient material such as rubber. In another arrangement, impact damage can be reduced by inclining the surface against which the particles impact.

In the arrangement of FIG. 1, the separator 21 includes a cover portion 21A which forms a closed channel through which the particle selected for the path 24 passes. This channel can include impact surfaces and/or other components which act to cause deceleration. Also in FIG. 1, the material exiting from the periphery 17 of the disk is collected in a collector channel 98 which contains a suitable deceleration material 99 as described herein.

All of the methods mentioned pertaining to deceleration while approaching the separation system are potential techniques that could be used to decelerate the particles after separation. Deceleration after separation will be very important depending on what is being sorted.

Thus in this embodiment, the end portion of the duct is mounted on a hinge which enables the end portion of the duct to slope either up or down so that exiting the duct are deflected either up or down. The end portion of the duct is attached to an actuator which may be a piezo actuator, a rotary voice coil or other suitable actuator. The advantage of this method is that the angular displacement of the end portion to the duct can be varied based on kernel quality characteristics to sort kernels into a plurality of output streams with a single device.

In the ejector, the kernel travels toward the ejector which consists of the wedge shaped head 40 mounted on the end of a piezo bimorph mounted in the tube. The position shown in FIG. 3A shows unpowered piezo bimorph in which a kernel has equal probability of being deflected into the upper bin or the lower been separated by the divider. The position shown in FIG. 3B shows position of ejector when +100 V is applied to piezo bimorph and kernels are deflected into the lower been. The position shown in FIG. 3C shows position of ejector when −100 V is applied to piezo bimorph and kernels are deflected into the upper bin.

The separator system as described and illustrated herein can be used with systems where there is no specific measurement of a parameter of the particle as the features of the separating device can be used in other fields.

Figure 10:
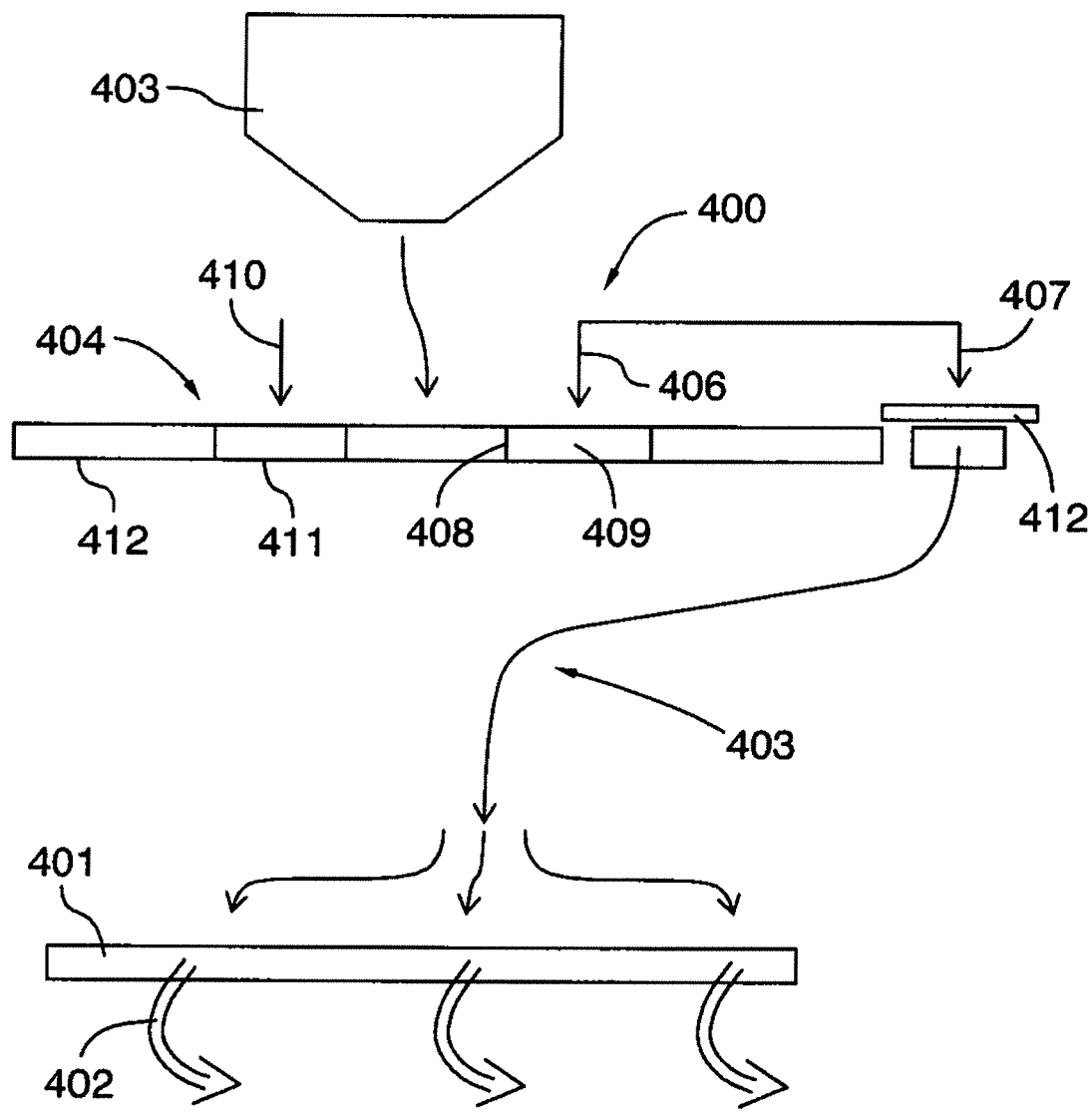
FIG. 10 is a schematic illustration of another embodiment where the separation system is used in a planting system for separation of viable seeds from less viable seeds and for counting the seeds so as to plant into the ground a required counted number of viable seeds.

As shown in FIG. 10, there is shown a seeding system generally indicated at 400 including a seeding tool bar 401 on which is mounted a series of individual planting devices 402. Each planter 402 is fed with seeds by a transfer duct system 403 which is fed with seeds from a separator 404 generally as described above where a hopper 405 supplies seeds to the separator.

Thus the measurement and separation system of the present invention is used on the seeding or planting apparatus 400 to sort seeds according to measured parameters related to viability so that seeds most likely to produce viable plants are planted and less viable seeds are used for other purposes. The present invention can be used to sort seeds according to size as detected by a sensor 406 for compatibility with planting devices. The sensor 406 can be used to count seeds so that a specified number can be planted or packaged. The arrangement also provides a rapid stream of singulated seeds separated by the separator 407 of known quality and number in a planting device. Because the number of singulated seeds per second provided by the present invention is much higher than prior art, a farmer can seed more acres per hour.

As shown at 408, a portion of the duct proximate to the measurement device 406 is comprised of a transparent material 409.

Also as shown at 410 a measurement devices is located proximate to a gap 411 in the duct gaps to measure different parameters of the particle with a view unobstructed by the walls of the ducts. In this arrangement the duct portion 412 is substantially parallel to the average velocity vector of the particles at the location of the gap 411 to minimize perturbation of particle flow along the duct.

Figure 6:
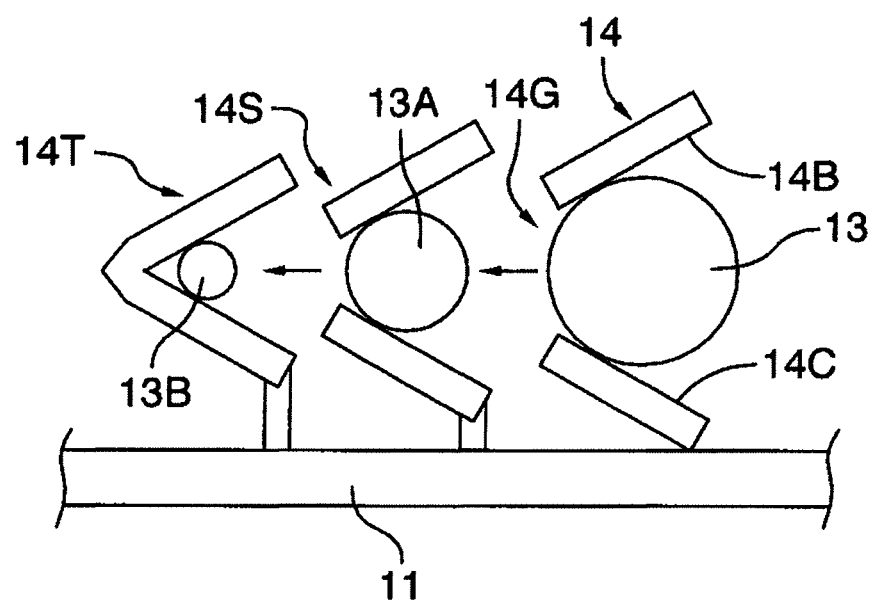
FIG. 6 is a schematic illustration of a stack of ducts for size separation of particles for use in the apparatus of FIG. 1.

As shown in FIG. 6, one duct is shown which basically has the V-shaped profile shown in FIG. 4. That is the duct 14 is shaped such that the acceleration causes the particle to move against the walls 14B, 14C of the duct where the wall is V-shaped to confine the particle to a base of the V-shape.

The wall 14 includes one or more openings 14G at the apex such that the particles 13 run on the walls 14B, 14C but components 13A smaller than the particles are separated from the particles by release through openings 14G. In the embodiment shown the openings 14G are in the form of a generally continuous opening along the apex. Thus each duct includes an associated second duct 14S parallel to the duct 14 into which the separated smaller components enter. This is then followed by a third duct 14T which again takes yet smaller particles 13B Thus there is a stack of such ducts 14, 14S, 14T so that the particles are separated by size from the first duct 14.

Also as shown schematically in FIG. 10, the separation of the particles at separator 407 is carried out using electrostatic forces where the particles are charged differentially according to selected parameters and then passed through a field 412 so that the differential charging causes the particles to divert to different paths.

Figure 9:
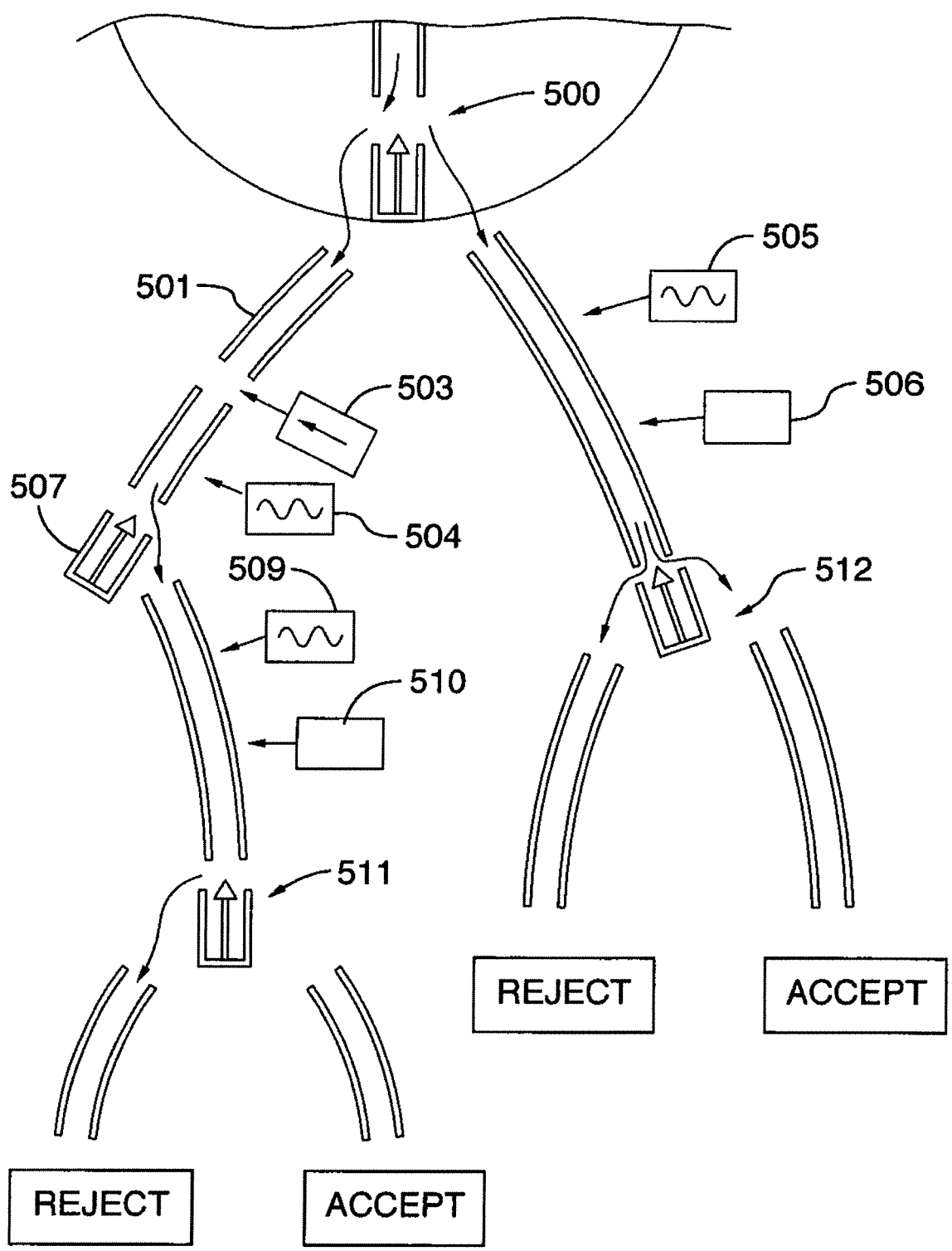
FIG. 9 is a schematic illustration of a method including a series of stages using the separation apparatus of FIG. 1.

FIG. 9 is a schematic illustration of a method including a series of stages using the separation apparatus of FIG. 1.

As shown, an initial singulation and separation process indicated at 500 based on particle size communicates the separated materials in paths 501 and 502. In path 501 the particles are subject to a coating step 503 followed by a UV curing step 504. In path 502 the particles are subject to a UV sterilization step 505 followed by an antibody application step 506.

At the end of path 501, a second separation step 507 based on size passes the particles accepted through a path 508. In path 508 the particles are subject to a UV sterilization step 509 followed by an antibody application step 510. At the end of path 508, a further separation step 511 selects the particles for accept or reject paths. Similarly at the end of path 502, a further separation step 512 selects the particles for accept or reject paths.

Figure 11:
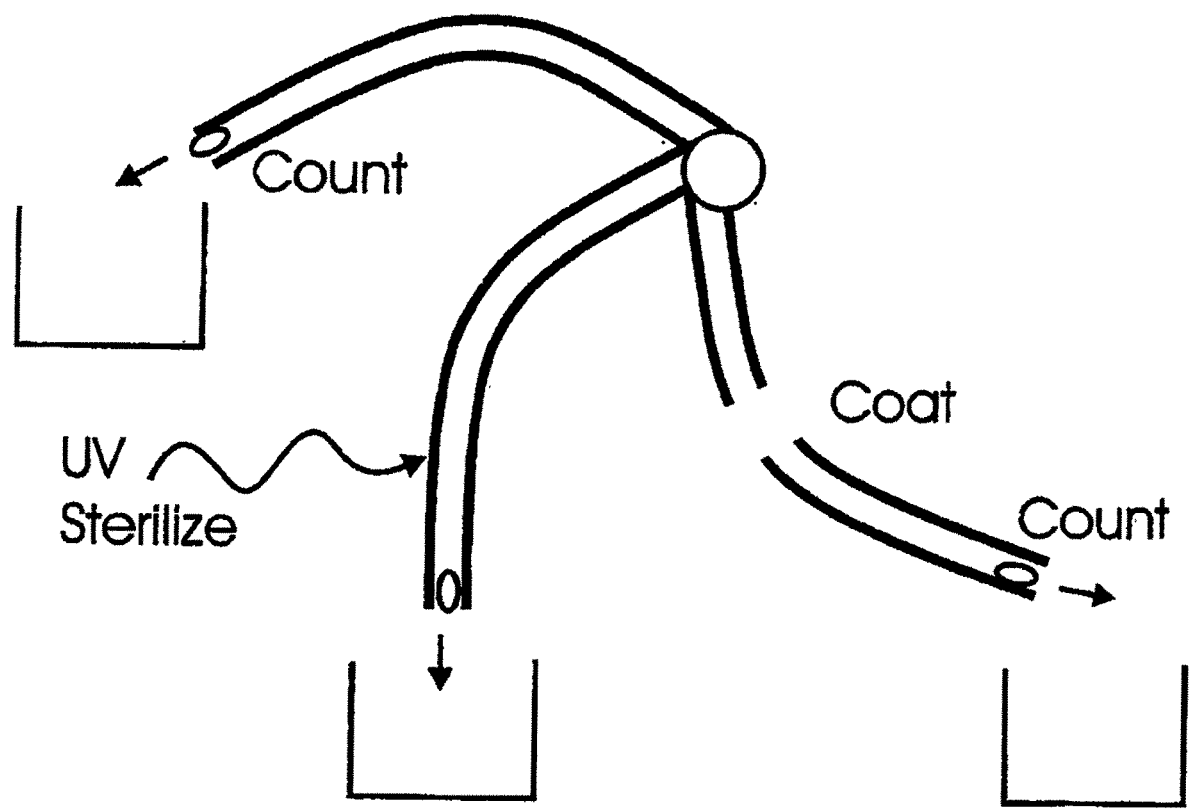
FIG. 11 is a schematic illustration of a method for carrying out different actions on the particle using the separation apparatus of FIG. 1.

FIG. 11 is a schematic illustration of different actions on the particle using the method of the present invention. That is in these cases the singulation method is used not for sorting as described above but instead for various operations such as counting, coating, sterilization and others.

Figure 12:
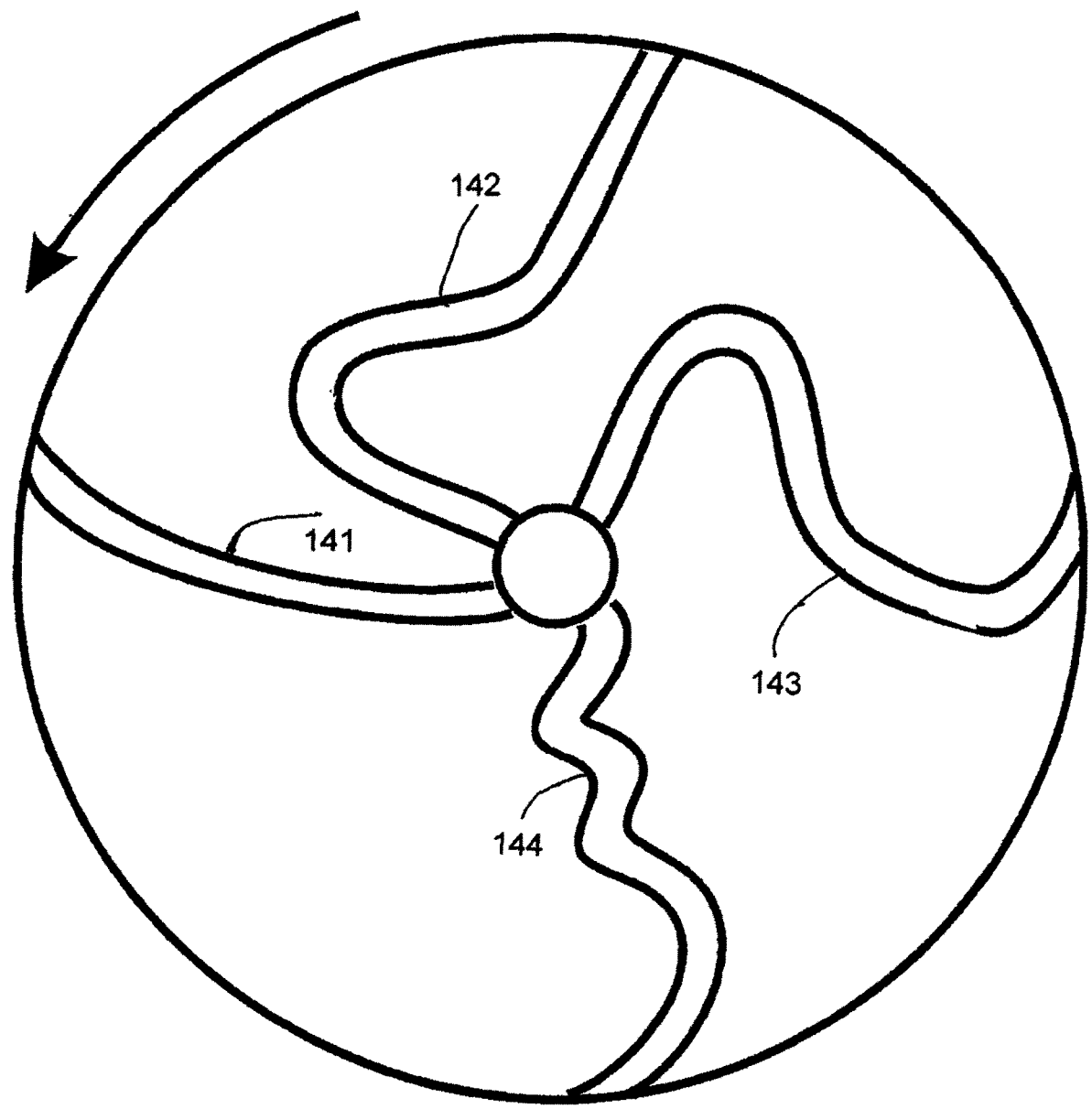
FIG. 12 is a schematic illustration of the disk for use in the method according to the present invention and showing different options for duct shape.

FIG. 12 is a schematic illustration of a disk of the apparatus of FIG. 1 showing different options for duct shape. In each duct, the angle of the duct to a radius of the disk causes different effects of acceleration, no acceleration (constant velocity) and deceleration. That is in duct 141 the particle as it moves outwardly is subjected to increasing acceleration. In duct 142 the particle as it moves outwardly is subjected to acceleration followed by constant velocity followed by further acceleration. In duct 143 the particle as it moves outwardly is subjected to acceleration followed by constant velocity followed by deceleration. In duct 144 the particle as it moves outwardly is subjected a variable velocity profile.

The invention claimed is:

1. A method for separating particles into a plurality of paths in response to a detected condition of the particles, the method comprising:
   carrying particles to be sorted in a supply conduit;
   forming the particles from the supply conduit into a stream of the particles in a row in at least one duct;
   locating a particle separating device at the stream operable to direct each particle into a selected one of said plurality of paths;
   wherein the particle separating device comprises a separating head having a front edge lying generally along the stream so that particles in the stream move toward the front edge, at least first and second side surfaces diverging away from the front edge and an actuator for moving the front edge;
   detecting the condition of the particles to determine a required separation of the particles;
   maintaining the front edge of the separating device at a position facing the stream;
   and in response to a detected condition of an approaching particle moving the front edge to either a first position on a first side of the stream arranged to direct the particle to a second side of the stream or to a second position on the second side of the stream arranged to direct the particle to the first side of the stream;
   wherein the front edge of the separating device is maintained at a neutral position facing the stream and in response to a detected condition of an approaching particle moving the front edge from the neutral position to either the first position or the second position.

2. The method according to claim 1 wherein said at least one duct is carried on a rotary body mounted for rotation around an axis of the rotary body, said rotary body defining said at least one duct thereon extending from an inner end adjacent the axis outwardly to an outer end spaced at a greater radial distance outwardly from the axis than the inner end, wherein said at least one duct lies in a radial plane of the axis of the rotary body and wherein the separating head is arranged in the radial plane and the first and second sides are arranged on respective sides of the radial plane.

3. The method according to claim 1 wherein the separating head includes inclined guide surfaces on the first and second sides of the front edge.

4. The method according to claim 1 wherein the separating head is generally wedge shaped.

5. A method for separating particles comprising:
   carrying particles to be sorted in a supply conduit;
   rotating a rotary body around an axis of the body;
   the rotary body defining at least one duct extending from an inner end adjacent the axis outwardly to an outer end spaced at a greater radial distance outwardly from the axis than the inner end;
   forming the particles from the supply conduit into a stream of the particles in a row in said at least one duct;
   locating a particle separating device at the stream operable to direct each particle into one of a plurality of paths;
   wherein the separating device comprises a separating head for separating the particles into separate paths and an actuator for moving separating head;
   wherein the separating head is carried on the rotary body and operates on the particles in the stream while on the rotary body.

6. The method according to claim 5 wherein the separating head and said at least one duct lies in a radial plane of the rotating body.

7. The method according to claim 5 wherein the separating head includes a front edge and inclined guide surfaces on the first and second sides of the front edge and wherein the front edge of the separating device is maintained at a neutral position facing the stream and in response to a detected condition of an approaching particle moving the front edge from the neutral position to either a first position on a first side of the stream arranged to direct the particle to a second side of the stream or to a second position on the second side of the stream arranged to direct the particle to the first side of the stream.

8. The method according to claim 5 including rotating the rotary body at an angular velocity which generates a centrifugal force on the particles which overcomes a friction force on the particles caused by contact of the particles with the duct thus causing the particles to be accelerated as the particles pass from the inner end to the outer end and causing the particles to be separated each from the next by a space by said acceleration caused by the centrifugal force in said at least one duct and causing the particles to be aligned one after another in a row in said at least one duct as the particles move toward the outer end.

9. The method according to claim 5 wherein a surface of said at least one duct includes rifling for engaging and rotating the particles in said at least one duct.

10. The method according to claim 5 including aligning longitudinal axes of each of the particles one behind another along the side wall of said at least one duct by applying a friction force on the particles relative to the side wall of said at least one duct.

11. A method for separating particles into first and second paths in response to a detected condition of the particles, the method comprising:
   carrying particles to be sorted in a supply conduit;
   forming the particles from the supply conduit into a stream of the particles in a row;
   locating a particle separating device at the stream operable to direct each particle into a selected one of said first and second paths located on respective sides of the particle separating device;
   wherein the particle separating device comprises a separating head having a front edge and first and second side surfaces diverging away from the front edge;
   detecting the condition of each of the particles in the stream to determine a required separation of the particles into either the first or the second paths depending upon the condition;
   the particle separation device being movable between first and second positions wherein the first position the front edge is located on a second side of the stream arranged to direct the particle to the first path on the first side of the stream and in the second position the front edge is located on a first side of the stream to direct the particle to the second path on the second side of the stream;

wherein in both the first and second positions the front edge faces the stream;

wherein in both the first and second positions both the first and second paths remain open to receive the particles from the stream;

and wherein the particle separation device moves between the first and second positions just sufficient so that in the first position the particle misses the front edge and engages the first side surface to be directed to the first path and in the second position the particle misses the front edge and engages the second side surface to be directed to the second path.

12. The method according to claim 11 wherein said duct is carried on a rotary body mounted for rotation around an axis of the rotary body, said rotary body defining said duct thereon extending from an inner end adjacent the axis outwardly to an outer end spaced at a greater radial distance outwardly from the axis than the inner end, wherein said duct lies in a radial plane of the axis of the rotary body and wherein the separating head is arranged in the radial plane and the first and second sides are arranged on respective sides of the radial plane.

13. The method according to claim 11 wherein the separating head is generally wedge shaped.

14. The method according to claim 11 wherein the front edge of the separating device is maintained at a neutral position facing the stream and in response to a detected condition of an approaching particle the front edge is moved from the neutral position to either the first position or the second position.

* * * * *